United States Patent
Pettersson

(10) Patent No.: US 11,400,827 B2
(45) Date of Patent: Aug. 2, 2022

(54) POWER NETWORK MANAGEMENT

(71) Applicant: HEXAGON TECHNOLOGY CENTER GMBH, Heerbrugg (CH)

(72) Inventor: Bo Pettersson, Luxembourg (LU)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 486 days.

(21) Appl. No.: 16/530,728

(22) Filed: Aug. 2, 2019

(65) Prior Publication Data
US 2020/0039377 A1 Feb. 6, 2020

(30) Foreign Application Priority Data
Aug. 2, 2018 (EP) .................................. 18187108

(51) Int. Cl.
| | |
|---|---|
| *B60L 53/63* | (2019.01) |
| *B60L 53/64* | (2019.01) |
| *B60L 53/66* | (2019.01) |
| *H02J 3/06* | (2006.01) |
| *G06N 20/00* | (2019.01) |

(Continued)

(52) U.S. Cl.
CPC .............. *B60L 53/63* (2019.02); *B60L 53/64* (2019.02); *B60L 53/66* (2019.02); *G05F 1/66* (2013.01); *G06N 20/00* (2019.01); *H02J 3/06* (2013.01); *H02J 3/003* (2020.01)

(58) Field of Classification Search
CPC .......... B60L 53/63; B60L 53/64; B60L 53/66; G05F 1/66; G06N 20/00; H02J 3/06; H02J 3/003; H02J 3/00; Y02E 40/70; Y02T 10/70; Y02T 10/7072; Y02T 90/12; Y02T 90/16; Y04S 10/50; G06Q 50/06; G06Q 10/00

See application file for complete search history.

(56) References Cited

U.S. PATENT DOCUMENTS

| | | | |
|---|---|---|---|
| 7,735,060 B2 | 6/2010 | Harvey et al. | |
| 9,103,686 B2 | 8/2015 | Pettersson | |

(Continued)

FOREIGN PATENT DOCUMENTS

EP    3 156 898 A1    4/2017

OTHER PUBLICATIONS

Extended European Search Report dated Jan. 28, 2019 as received in Application No. 18187108.8.

*Primary Examiner* — Nha T Nguyen
(74) *Attorney, Agent, or Firm* — Maschoff Brennan

(57) ABSTRACT

A power network management system for managing distribution of electric energy to a multitude of power consumers by means of a power grid, the system comprising a plurality of software agents and a convergence unit. Each software agent is adapted to be connected to one of the power consumers and to exchange data with the power consumer, wherein each software agent is adapted to exchange data with the power consumer, and wherein the convergence unit is adapted to request and receive consumption-related data of the consumers, to estimate energy consumption needs of each of the consumers within a defined time period, to generate an optimized energy distribution plan for distributing available electric energy among the consumers, to generate consumption plan data for each of the consumers, and to provide the consumption plan data to the software agents of the consumers.

15 Claims, 5 Drawing Sheets

(51) Int. Cl.
*G05F 1/66* (2006.01)
*H02J 3/00* (2006.01)

(56) References Cited

U.S. PATENT DOCUMENTS

| | | |
|---|---|---|
| 2008/0005287 A1 | 1/2008 | Harvey et al. |
| 2008/0010631 A1 | 1/2008 | Harvey et al. |
| 2010/0082277 A1 | 4/2010 | Ballard |
| 2012/0221163 A1 | 8/2012 | Forbes, Jr. |
| 2014/0142774 A1 | 5/2014 | Katayama et al. |
| 2015/0298565 A1* | 10/2015 | Iwamura ............... B60L 53/60 701/22 |
| 2017/0060629 A1* | 3/2017 | Vora ..................... G06F 9/4881 |

* cited by examiner

POWER NETWORK MANAGEMENT

CROSS-REFERENCE TO RELATED APPLICATIONS

This application claims priority to European Patent Application No. 18187108, filed on Aug. 2, 2018. The foregoing patent application are incorporated herein by reference.

FIELD OF THE INVENTION

The present invention pertains to a power network management system and method for managing distribution of electric energy from a power network to a multitude of power consumers by means of a power grid.

BACKGROUND

Power distribution over an electrical grid to a plurality of independent consumers is a complicated process. Component failures, unanticipated demand for electricity due to weather changes, the increasing load due to modern electronics, and other technical issues make grid management an increasingly complex balance of supply and demand. Especially since the increase of battery operated cars and so-called plug-in hybrid cars, power distributors are confronted increasingly with the problem of peaks in the power demand Although modern grids may use a certain level of power scheduling, such scheduling tends to be relatively static and inefficient.

US 2010/0082277 A1 discloses a system and method for managing distributed charging of electric cars. U.S. Pat. No. 9,103,686 B2 discloses a system for managing a distribution of batteries to battery-operated cars taking into account the planned paths of the cars and a forecasted energy consumption for each car resulting from its planned path.

A need exists for a system that is able to manage the provision of power to different consumers across a power grid more efficiently.

BRIEF DESCRITPTION OF THE INVENTION

It is an object of some aspects of the present invention to provide an improved system and method for managing distribution of electric energy from a power network to a multitude of power consumers by means of a power grid.

Particularly, it is an object to provide such and system and method that can be used with existing power grids and power consumers.

One object is to provide such and system and method that allow avoiding peaks in power consumption.

It is a further object of some aspects of the invention to provide such a system and method wherein the power consumers comprise battery operated cars, particularly wherein energy is distributable to the cars' batteries to allow the cars' to complete planned journeys.

At least one of these objects is achieved by the system according to claim 1, the method according to claim 14 and/or the dependent claims of the present invention.

A first aspect of some embodiments of the invention relate to a power network management system for managing distribution of electric energy from a power network to a multitude of power consumers by means of a power grid. According to this aspect of the invention, the system comprises a plurality of software agents and a convergence unit having a computing unit, a memory unit and at least one machine-learning algorithm. Each software agent is either installable on a power consumer of the multitude of power consumers or installed on a communication module that is adapted to be connected to one of the power consumers and to exchange data with the power consumer connected to. Moreover, each software agent is adapted to exchange data with the power consumer it is installed on or connected to and with the convergence unit. The convergence unit is adapted

- to request and receive from the plurality of agents consumption-related data of the consumers, wherein the consumption-related data comprises at least information about a wattage, user settings, past energy consumption, and/or a consumption prognosis that are associated with the respective consumer,
- to estimate, based on the consumption-related data and using the at least one machine-learning algorithm, energy consumption needs of each of the consumers within a defined time period,
- to generate, based on the estimated consumption needs, an optimized energy distribution plan for distributing available electric energy among the consumers,
- to generate consumption plan data for each of the consumers, the consumption plan data comprising instructions for the consumers when to consume electric energy, and
- to provide the consumption plan data to the software agents of the consumers.

According to one embodiment of the system, at least one of the software agent is adapted to control, based on the consumption plan data, functions of the power consumer it is installed on or connected to. In particular, controlling the functions comprises reducing or blocking energy consuming functions of the consumer during at least a first part of the time period and increasing or allowing energy consuming functions of the consumer at least during a second part of the time period.

According to another embodiment of the system, said defined time period comprises at least six hours, in particular at least 24 hours.

According to another embodiment, the system comprises a plurality of charging stations and the consumers comprise a plurality of battery operated cars, each car being connectable to the charging stations for charging a battery of the car, each car's consumption-related data comprising at least information about an actual and maximum charging condition of the car's battery, particularly wherein each car is assigned to one of the charging stations.

In one embodiment, a software agent of at least a first car of the plurality of cars is adapted to send consumption-related data of the first car to the convergence unit via remote data transmission means (e.g. comprising a wireless Internet connection) when the car is not connected to one of the charging stations, for instance when the car is travelling. The consumption-related data of the first car comprises information about an expected time of arrival at one of the charging stations and/or an expected charging condition of the car's battery at the arrival at one of the charging stations.

In another embodiment, each car's consumption-related data comprises usage information related to a planned use of the car in a near future, the usage information at least comprising information about a planned start of a journey involving the car. The near future comprises at least the defined time period, in particular at least twice the time of the defined time period. The software agent installed on or connected to the car may be adapted to receive a user input related to the planned use of the car, and the usage information may be derived from the user input.

In one embodiment, each car's consumption-related data comprises information related to the energy consumption of the car, e.g. based on a past energy consumption, a weight and/or a load of the car, and the usage information at least comprises information about a planned destination and/or path of the car journey. In this embodiment, the convergence unit is adapted to estimate the energy consumption needs of the car based on the consumption-related data and on the information about the planned destination and/or path. In a particular embodiment, the convergence unit is adapted to estimate the energy consumption needs based on consumption parameters comprising at least on a subset of:

- a weather forecast for the path during the journey, comprising at least a temperature forecast;
- a forecast of traffic conditions to be expected on the path;
- an altitude profile of the path;
- a driver's characteristic of a driver of the car, either human or non-human;
- an information history of other cars and/or drivers previously travelling the path;
- road types and/or conditions of the path; and/or
- an information from traffic information or traffic guidance systems.

According to another embodiment of the system, a plurality of households is connected to the power grid, wherein each household comprises at least one consumer. According to a particular embodiment, the convergence unit is adapted to generate an optimized energy distribution plan for at least a first household for distributing electric energy among the consumers of the first household.

According to a further embodiment of the system, the convergence unit is connected to the power grid, wherein the software agents and the convergence unit are adapted for data transmission via the power grid at least between the convergence unit and each of the software agents.

According to yet another embodiment of the system, one or more power generators are connected to the power grid and adapted to supply electrical energy to the power grid, the generators comprising at least one of solar panels, gasoline, gas or diesel powered generators, and rechargeable battery packs. For instance, local power generators may be distributed among a plurality of households connected to the power grid. According to this embodiment, the system comprises a plurality of generator-related software agents, each of which being either installable on a power generator of the multitude of power generators or installed on a communication module that is adapted to be connected to one of power generators and to exchange data with the power generator connected to. Each generator-related software agent is adapted to exchange data with the power generator it is installed on or connected to and with the convergence unit, wherein the convergence unit is adapted

- to request and receive from the plurality of generator-related software agents supply-related data of the generators, wherein the supply-related data comprises at least information about a wattage, user settings, past energy production, and/or a supply prognosis that are associated with the respective generator,
- to estimate, based on the supply-related data and using the at least one machine-learning algorithm, an energy supply potential of each of the generators within the defined time period, and
- to generate the optimized energy distribution plan also based on the estimated energy supply potential.

According to a particular embodiment, the convergence unit is moreover adapted

- to generate supply plan data for at least one generator, the supply plan data comprising instructions for the generator when to supply electric energy, and
- to provide the supply plan data to the software agent of the at least one generator.

In one embodiment, the memory unit comprises a database comprising information of past energy production of each of the power generators, the database being updated continuously, and the at least one machine learning algorithm is adapted to access the data stored in the database and to schedule a service or a replacement of a power generator based on the information of past energy production of the power generator.

According to a further embodiment of the system, the memory unit comprises a database comprising information of past energy consumption of each of the power consumers, the database being updated continuously, and the at least one machine learning algorithm is adapted to access the data stored in the database and to schedule a service or a replacement of a power consumer based on the information of past energy consumption of the power consumer. Alternatively or additionally, the database may comprise information of past energy production of each of the power generators, the database being updated continuously, and the at least one machine learning algorithm is adapted to access the data stored in the database and to schedule a service or a replacement of a power generator based on the information of past energy production of the power generator.

According to yet another embodiment of the system, the memory unit comprises a database comprising information of past energy consumption, and the at least one machine learning algorithm is adapted to access the data stored in the database and to base an estimation of the energy consumption needs on the information of past energy consumption. In particular, said information of past energy consumption comprises consumption-related data of one or more consumers interrelated to at least a subset of time of the day, time of the year, and weather information, e.g. comprising a temperature.

A second aspect of some embodiments of the invention relates to a method for managing energy distribution in a power network comprising a multitude of electric consumers connected by means of a power grid, the method comprising

- providing a power network management system (for instance a system according to the first aspect of the invention described above), wherein the power network management system comprises a convergence unit having a computing unit, a memory unit and at least one machine-learning algorithm,
- providing a software agent to each one of the consumers, wherein each software agent is adapted to exchange data with the respective consumer and wherein providing the software agent comprises either installing the software agent on the consumer or connecting a communication module to the consumer, wherein the software agent is installed on the communication module,
- requesting and receiving from the software agents consumption-related data of the consumers, wherein the consumption-related data comprises at least information about a wattage, user settings, past energy consumption, and/or a consumption prognosis that are associated with the respective consumer,
- estimating, based on the consumption-related data and using at least one machine-learning algorithm, energy consumption needs of each of the consumers within a defined time period, generating, by means of an algorithm and based on the estimated consumption needs, an optimized energy distribution plan for distributing available electric energy among the consumers, generating consumption plan data for each of the consumers, the consumption plan data comprising instructions for the consumers when to consume electric energy, and providing, via the software agents, the consumption plan data to the consumers.

Another aspect of some aspects of the invention relate to a computer programme product comprising programme code which is stored on a machine-readable medium, or being embodied by an electromagnetic wave comprising a programme code segment, and having computer-executable instructions for performing, in particular when run on a computing unit of a system according to the first aspect of the invention, at least the following steps of the method according to the second aspect of the invention:

estimating, based on the consumption-related data and using at least one machine-learning algorithm, energy consumption needs of each of the consumers within a defined time period, generating, based on the estimated consumption needs, an optimized energy distribution plan for distributing available electric energy among the consumers, generating consumption plan data for each of the consumers, and providing the consumption plan data to the consumers.

BRIEF DESCRIPTION OF THE DRAWINGS

The invention in the following will be described in detail by referring to exemplary embodiments that are accompanied by figures, in which.

DETAILED DESCRIPTION

Figure 1:
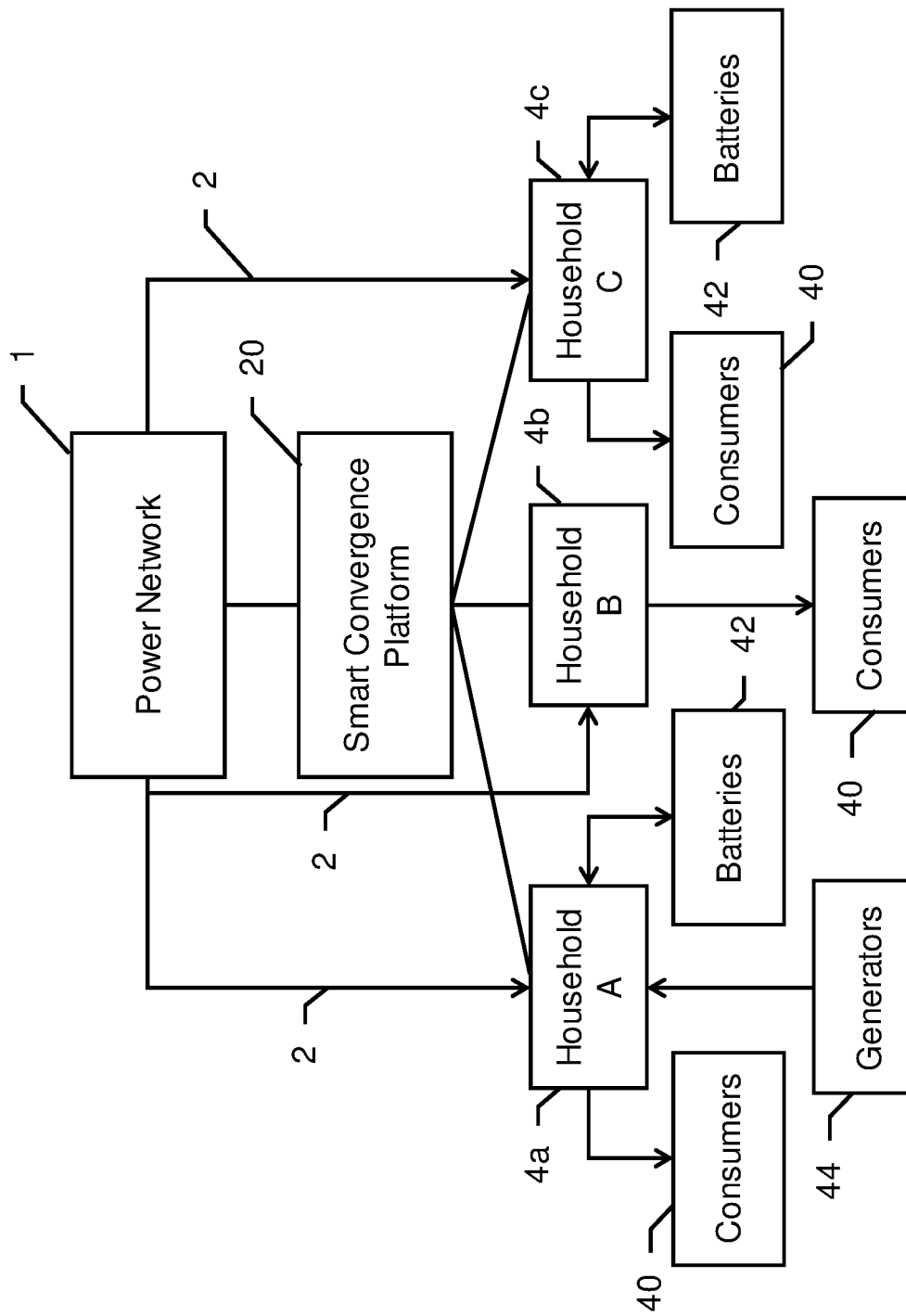
FIG. 1 shows a power network comprising a power network management system according to the invention.

FIG. 1 shows an exemplary power network 1 with an exemplary embodiment of a power network management system according to the invention. One or more power plants (not depicted) can be connected to the power network 1 to provide electric energy to the network. Three households 4a-c are connected to the network 1 by means of a power grid, wherein each household 4a-c comprises power consuming devices 40. Households A and C comprise rechargeable battery packs 42 that can be charged by means of electricity provided by the power network 1 and can supply their energy back to the network or to the household's consumers 40. Household A furthermore comprises at least one power generator 44 that is adapted to supply energy to the network 1 or to the household's consumers 40. For instance, such power generators 44 may comprise solar panels, or fuel powered generators using e.g. gasoline, gas or diesel.

A smart convergence platform 20 of the power network management system is connected to the power network 1 and to the households 4a-c and adapted to manage the distribution of electric energy from the power network to the multitude of power consumers 40, thereby avoiding peaks in the power consumption.

The power consumers 40 are rendered self-describing. Based on consumption-related data gathered from the self-describing consumers their energy needs can be analysed and an energy distribution plan can be generated.

Figure 2:
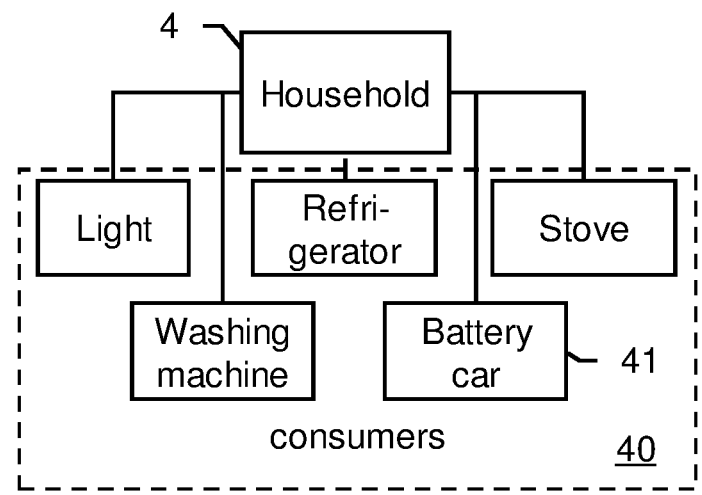
FIG. 2 shows the consumers of a household connected to the power network of FIG. 1.

FIG. 2 shows consumers 40 of an exemplary household 4. These comprise lighting, a washing machine, cooking facilities like a stove and other kitchen equipment like refrigerators or freezers. The household 4 also comprises at least one battery operated car 41 that is loaded via the power grid connecting the household to the power network of FIG. 1.

Figure 3:
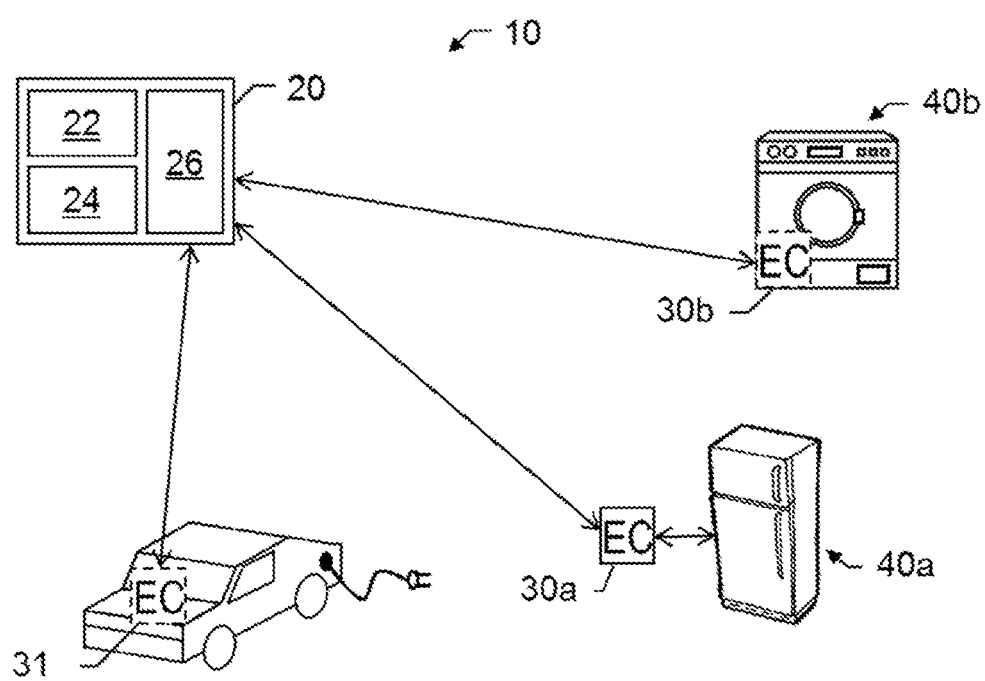
FIG. 3 shows a first exemplary embodiment of a power network management system according to the invention.

FIG. 3 illustrates a first exemplary embodiment of a system 10 according to the invention. The system 10 comprises a smart convergence unit 20 and three software agents 30a, 30b, 31. The convergence unit 20 comprises a computing unit 22 comprising a processor, a memory unit 24 adapted for storing data, and a communication unit 26 (e.g. comprising a modem) allowing data interchange with the agents 30a, 30b, 31. The convergence unit 20 need not be a single device but can as well be embodied as a cloud or a plurality of devices.

A system according to the invention can comprise several of these software agents ("EdgeClient" (EC)) connected together using a service bus or a system and data integration software such as EdgeFrontier® (EF) of Intergraph Corporation. Applicable integration tools to be used with the application are generally known in the art and disclosed e.g. in the documents EP 3 156 898 A1, U.S. Pat. No. 7,735,060 B2, US 2008/0005287 A1 and US 2008/0010631 A1.

As shown in FIG. 3, the software agents (EC) can be either provided in agent modules connected to the consumer devices or installed on the consumer devices directly. The software agents allow translation of data transmitted between the consumers and the convergence unit.

A first software agent 30a is provided in an agent module that is connected to a first power consumer (refrigerator 40a). The module with the agent 30a installed thereon is connected to the consumer device 40a and adapted to exchange data with the connected device. For instance, such a connection might include using a universal serial bus (USB) or other hardware interface or a wireless data connection such as Bluetooth.

A second power consumer (washing machine 40b) is adapted to allow installing external software or deploying a set of microservices. The respective agent 30b can therefore be provided as a software application directly in the device 40b instead of being provided in a module that is connectable to the device 40b. It is also possible to provide the software by app delivery.

The third power consumer in this example is a battery operated car 41 having a computer that allows installing external software. The third software agent 31 of the system 10 is therefore installed on the car's computer.

The convergence unit 20 may be connected with the consumers 40b, 41 and the module of agent 30a via the Internet or by means of a wireless local area network (WLAN) or by means of mesh networks such as LoRa or ZigBee or Bluetooth. In one embodiment, the data transmission may occur directly via the power grid.

Figure 4:
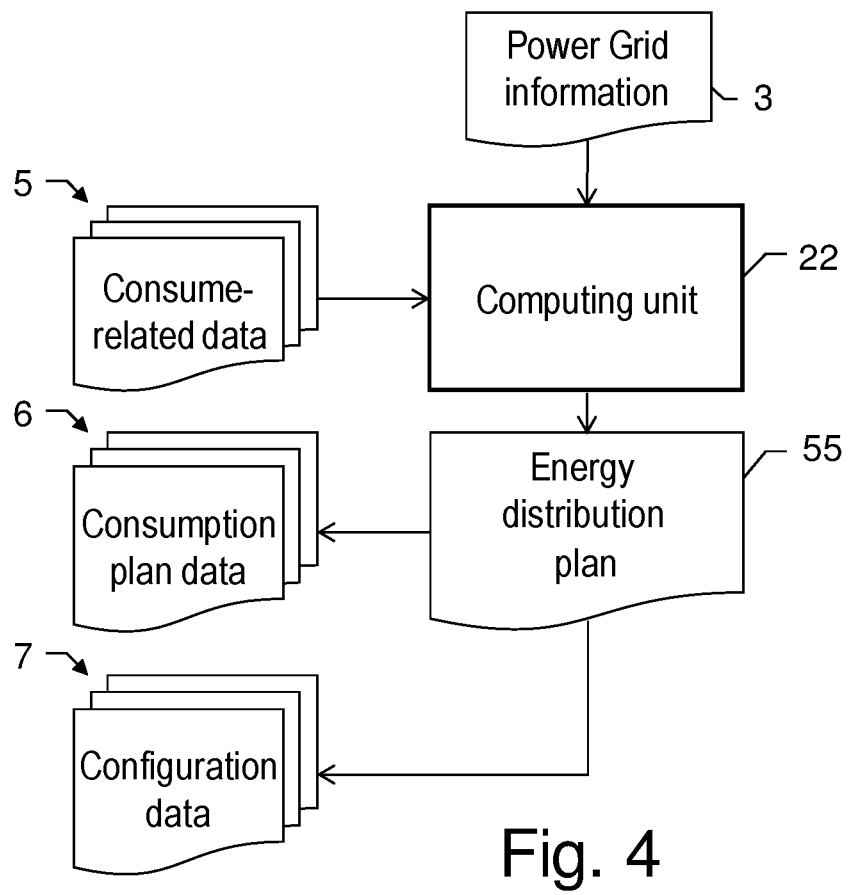
FIG. 4 illustrates the information stream in an exemplary embodiment of a system according to the invention.

FIG. 4 illustrates the information stream in an exemplary embodiment of a system according to the invention. The computing device 22 of the smart convergence unit receives power grid information 3, e.g. comprising information about a capacity of the power grid and the power available in the network during a defined time period. The consumer devices are rendered self-describing by connecting agent modules to the devices or installing the software agents directly on the devices (as shown in FIG. 3).

Consumption-related information 5 is requested and received from the connected consumer devices via the software agents. This consumption-related information 5 particularly comprises wattage, user settings, past energy consumption, and/or a consumption prognosis associated with the respective consumer device.

Consequently, based on the consumption-related data 5 of the connected consumer devices, the computing device 22 estimates the energy consumption needs of each of the consumers within the defined time period and generates, based thereon, an optimized energy distribution plan 55 for distributing the electric energy available during the defined time period among the consumers. The energy distribution plan 55 may be optimized to meet the needs of all devices, thereby reducing peaks in the overall energy consumption as well as possible. Alternatively, the optimization may comprise holding the overall energy consumption steady, thereby meeting the needs of the single consuming devices as well as possible. The aim of the optimization may be achieved with the aid of a pricing policy that rewards flexibility regarding the time of power consumption.

In concordance with the energy distribution plan 55, consumption plan data 6 for each consumer is generated and transmitted to the respective consumers via their software agents. The consumption plan data 6 comprises a schedule for consuming electric energy, e.g. when the device is allowed to consume what amount of energy, and/or how much the power consume (e.g. per kWh) costs at what point of time.

Furthermore, in the depicted embodiment the computing unit 22 is adapted to generate, based on the energy distribution plan 55 and on the consumption-related data 5, configuration data 7 for one or more of the connected consumers and to provide it to the software agents of these devices. This configuration data 7 is adapted to reconfigure the device it is provided to in order to allow to adapt to the energy consumption allowed by the energy distribution plan 55.

The configuration data 7 need not be generated for all consumers. Instead, based on the consumption-related data 5, the computing unit 22 assesses which device can be reconfigured in which way in order to allow or improve changing its energy consume to meet the requirements of the energy distribution plan 55.

For instance, a refrigerator can be reconfigured to reduce the temperature at a first part of the time period, consuming more energy during this time period, and to save energy during a second part of the time period, during which the temperature slowly rises back to the normal temperature. A washing machine might be reconfigured to interrupt a washing cycle during a certain time period or to reschedule the washing cycle to perform less energy consuming steps at the certain time period and more energy consuming steps before or after that. Other devices can be set into an energy saving mode for certain time periods. A loaded car's battery can be configured to supply energy to the grid at one time and load again at a later time period.

The consumption-related data 5, the consumption plan data 6 and the configuration data 7 can be sent encrypted. Encryption and decryption on the consumers' side can be performed by the assigned software agents.

Figure 5:
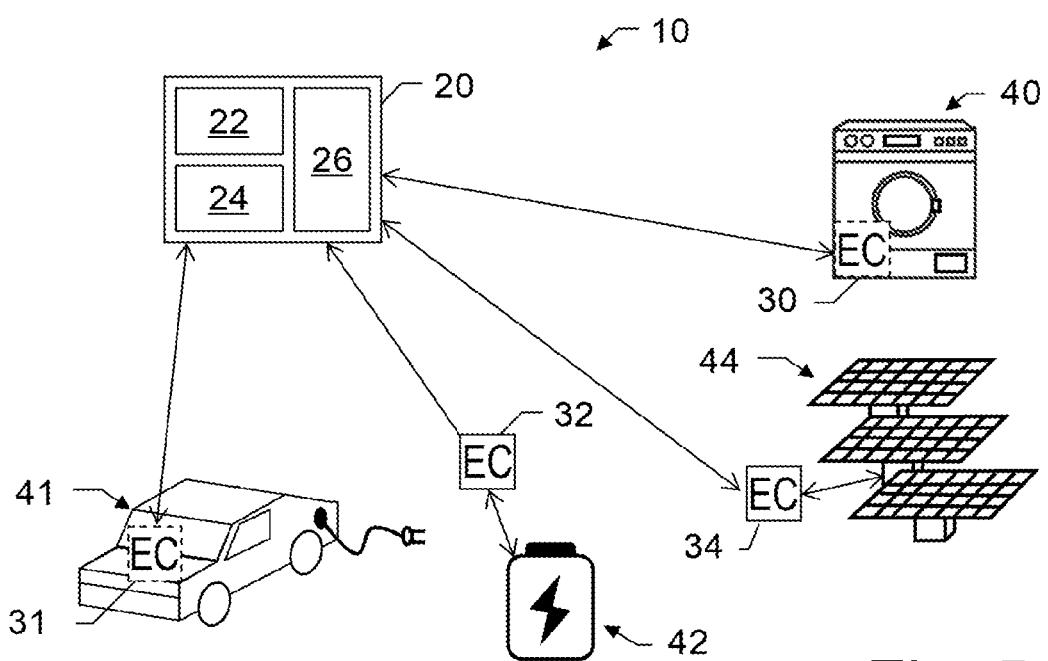
FIG. 5 shows a power network comprising a power network management system according to the invention.

FIG. 5 illustrates a second exemplary embodiment of a system 10 according to the invention. In contrast to the system of FIG. 3, the system is connected to both energy consuming and supplying devices.

The system 10 comprises a smart convergence unit 20 and four software agents 30, 31, 32, 34. The convergence unit 20 comprises a computing unit 22 comprising a processor, a memory unit 24 adapted for storing data, and a communication unit 26 (e.g. comprising a modem) allowing data interchange with the agents 30, 31, 32, 34, e.g. via the power grid or by means of an Internet connection. The convergence unit 20 need not be a single device but can as well be embodied as a cloud or a plurality of devices.

A system according to the invention can comprise several of these software agents ("EdgeClient" (EC)) connected together using a service bus or a system and data integration software such as EdgeFrontier® (EF) of Intergraph Corporation. Applicable integration tools to be used with the application are generally known in the art and disclosed e.g. in the documents EP 3 156 898 A1, US 2008/0005287 A1, US 2008/0010631 A1 and U.S. Pat. No. 7,735,060 B2.

As shown in FIG. 5, the software agents (EC) can be either provided in agent modules connected to the devices (in this example the agents 32 and 34) or installed on the devices directly (in this example the agents 30 and 31). The software agents allow translation of data transmitted between the connected devices and the convergence unit.

A first power consumer (washing machine 40) is adapted to allow installing external software or deploying a set of microservices. The respective agent 30 can therefore be provided as a software application directly in the device 40. It is also possible to provide the software by app delivery. A second power consumer (battery operated car 41) has a computer that allows installing external software. The respective software agent 31 is therefore installed on this computer.

A third software agent 32 and a fourth software agent 34 are each provided in an agent module that is connected to a rechargeable battery pack 42 and a solar panel 44. The modules with the agent 32, 34 installed thereon are connected to the battery pack 42 and the solar panel 44, respectively, and adapted to exchange data with the connected devices. For instance, such a connection might include using a universal serial bus (USB) or other hardware interface or a wireless data connection such as Bluetooth.

The convergence unit 20 may be connected with the consumers 40, 41 and the modules of agents 32 and 34 via the Internet or by means of a wireless local area network (WLAN) or by means of mesh networks such as LoRa or ZigBee or Bluetooth. In one embodiment, the data transmission may occur directly via the power grid.

Figure 6:
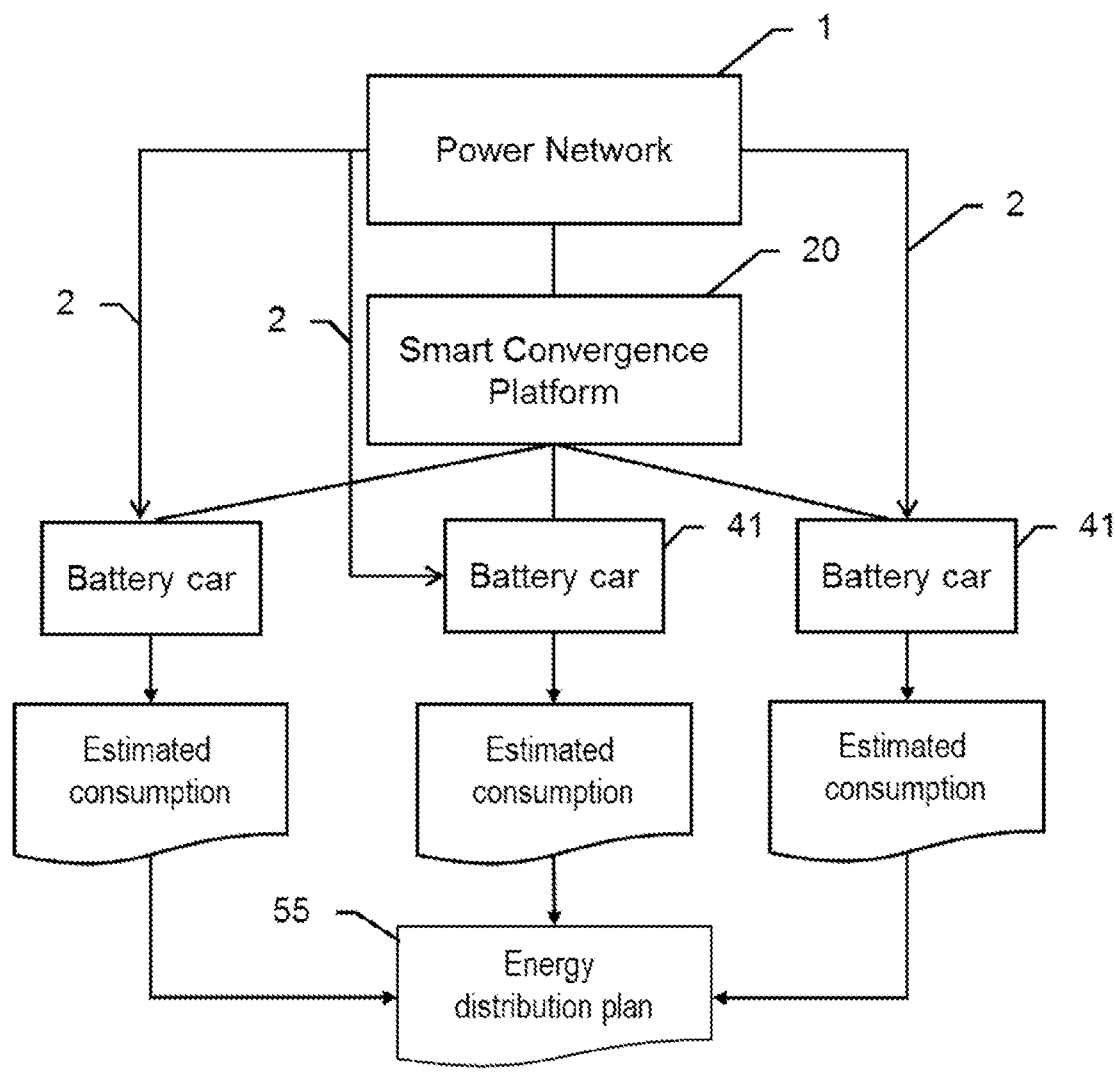
FIG. 6 shows a power network comprising a power network management system according to the invention, a plurality of battery cars being connected to the network.

FIG. 6 shows an embodiment of a system according to the invention for managing a power network 1 to which a multitude of battery operated cars 41 are connected via a power grid 2. In order to generate the energy distribution plan 55 for these cars, it would be advantageous to estimate the energy consumption of each car 41 during the next journey as precisely as possible. Each car's battery could then be loaded with just the sufficient amount of energy.

The system may comprise a plurality of charging stations (not depicted) connected to the power grid 2, each car 41 being connectable to all or at least one of the charging stations for charging the battery of the car. Moreover, each car may be assigned to one of the charging stations, i.e. its home station, but may as well be loaded at other charging stations of the system, e.g. at the driver's place of work.

Figure 7:
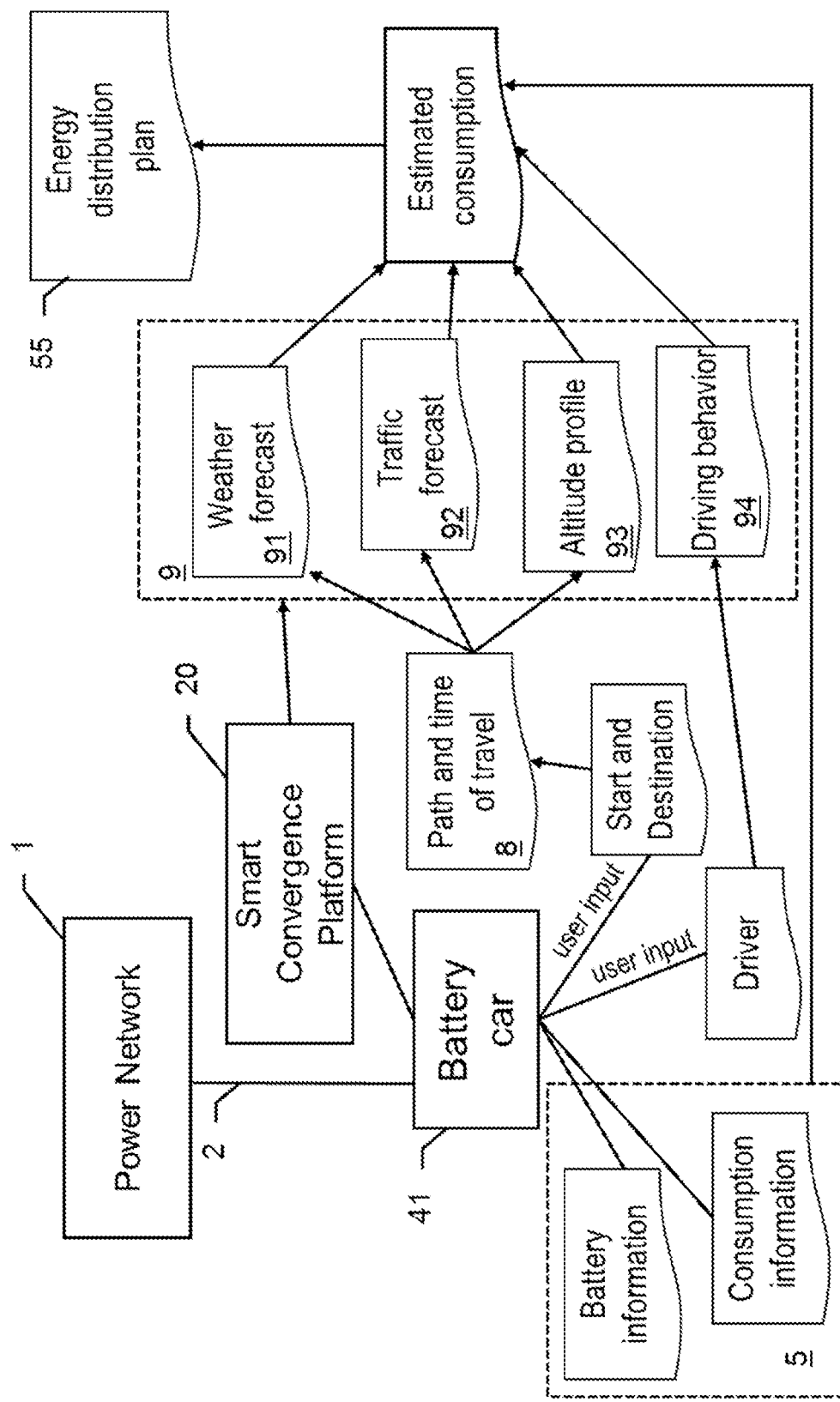
FIG. 7 illustrates consumption forecast for a battery car by means of the power network management system of FIG. 6.

FIG. 7 illustrates with the example of a single car 41, how the consumption of the car 41 during a travel can be forecast by an exemplary embodiment of a system according to the invention. The battery operated car 41 is connected to the power network 1 via the power grid 2. It is furthermore connected to smart convergence platform 20 as illustrated in FIGS. 3 and 5. By means of the installed software agent, the car 41 is rendered self-describing, so that consumption-related data 5 of the car is transmitted to and stored at the convergence platform 20. In case of a battery operated car 41 the consumption-related data 5 comprise at least battery information and consumption information.

The battery information relates to a status of the battery, i.e. comprising information about an actual and maximum charging condition of the car's battery. The information related to the maximum charging condition can be based on manufacturer's data, on a loading history or on statistical data taking into account a wearing and age of the battery. The consumption information relates to the energy consumption of the car, based on manufacturer's data, or a history of past energy consumption and information about an empty load weight.

To forecast the consumption, it is moreover helpful to know details about a planned journey. This information can be input by the car's owner or user, for example as a general rule if the journey is basically the same every day (e.g. a journey to and from work), or for a specific destination on the night before the planned journey. The information may comprise only the destination or also the path to the destination. The information also comprises the planned start of the journey and optionally also information about the driver or drivers and a revenue load. Based on the user input, the smart convergence platform 20 is adapted to use a navigation software to calculate a path and time of travel 8.

The smart convergence platform 20 advantageously is adapted to base the consumption estimation also on external consumption parameters 9 that might influence the consumption of the car during the travel and are neither provided by the car 41 as a part of the consumption-related data 5 nor provided by the user as part of the usage data.

These external consumption parameters 9 can be path-related parameters, e.g. an altitude profile 93 of the path, a forecast of traffic conditions 92 that are to be expected on the path at the time of travel, an information history of other cars or drivers previously travelling the path, information about road types and conditions along the path, or information from traffic information or traffic guidance systems.

Another external consumption parameter 9 is weather-related and comprise a weather forecast 91 for the path during the journey. Low temperatures may reduce the battery capacity and increase the energy consumption due to heating. High temperatures may increase the energy consumption due to air conditioning. Moreover, precipitation such as snow, fog and heavy rain may influence the driving behaviour.

A further external consumption parameter 9 is driver-related. A driver's characteristic 94 of a driver of the car 41 during the journey can be derived from a consumption history of the car 41 or even of other cars sharing this information. Also autonomous driving capabilities of the car can be taken into account. Moreover, loading capacity at the destination and/or along the path (e.g. by means of available charging stations connected to the power grid of the system) can be incorporated into the considerations.

Based on these information, the smart convergence platform estimates the consumption of the car during the journey and, thus, how much energy the battery needs to be supplied with before the planned start of the journey. The estimation for this car 41 and a multitude of other cars (see FIG. 6) and other consumers (see FIG. 1) is then used for generating the energy distribution plan 55.

The cars may optionally be adapted to send consumption-related data and data about their battery status to the convergence unit of the system via a wireless Internet connection or other remote data transmission means, so that this data is available when the car is still travelling or not connected to one of the charging stations for other reasons. The data may also comprise information about an expected time of arrival at one of the charging stations and/or an expected charging condition of the car's battery at the arrival at one of the charging stations.

Although the invention is illustrated above, partly with reference to some preferred embodiments, it must be understood that numerous modifications and combinations of different features of the embodiments can be made. All of these modifications lie within the scope of the appended claims.

What is claimed is:

1. A power network management system for managing distribution of electric energy from a power network to a multitude of power consumers by means of a power grid, wherein one or more power generators are connected to the power grid and are adapted to supply electrical energy to the power grid, the power management system comprising a plurality of consumer-related software agents, a plurality of generator-related software agents, and a convergence unit, wherein:

the convergence unit comprises a computing unit, a memory unit, and at least one machine- learning algorithm, each consumer-related software agent is:

installable on a power consumer of the multitude of power consumers, or installed on a communication module that is adapted to be connected to one of the power consumers and to exchange data with the power consumer, each generator-related software agent is:

installable on a power generator of the multitude of power generators or installed on a communication module that is adapted to be connected to one of power generators and to exchange data with the power generator connected to, each consumer-related software agent and each generator-related software agent is adapted to exchange data with the power consumer or power generator it is installed on or connected to and with the convergence unit, and the convergence unit is adapted:

to request and receive from the plurality of consumer-related agents consumption- related data of the consumers, wherein the consumption-related data comprises at least information about a wattage, user settings, past energy consumption, or a consumption prognosis that are associated with the respective consumer, to estimate, based on the consumption-related data and using the at least one machine- learning algorithm, energy consumption needs of each of the consumers within a defined time period, to request and receive from the plurality of generator-related software agents supply-related data of the generators, wherein the supply-related data comprises at least information about a wattage, user settings, past energy production, or a supply prognosis that are associated with the respective generator, to estimate, based on the supply-related data and using the at least one machine-learning algorithm, an energy supply potential of each of the generators within the defined time period, to generate, based on the estimated consumption needs and the estimated energy supply potential, an optimized energy distribution plan for distributing available electric energy among the consumers, to generate consumption plan data for each of the consumers, the consumption plan data comprising instructions for the consumers when to consume electric energy, and to provide the consumption plan data to the software agents of the consumers.

2. The system according to claim 1, wherein at least one of the consumer-related software agents is adapted to control, based on the consumption plan data, functions of the power consumer it is installed on or connected to.

3. The system according to claim 1, wherein the defined time period comprises at least six hours.

4. The system according to claim 1, the system further comprising:
a plurality of charging stations, wherein the consumers comprise a plurality of battery operated cars, each car being connectable to the charging stations for charging a battery of the car, each car's consumption-related data comprising at least information about an actual and maximum charging condition of the car's battery.

5. The system according to claim 4, wherein a software agent of at least a first car of the plurality of cars is adapted to send consumption-related data of the first car to the convergence unit via remote data transmission means when the car is not connected to one of the charging stations, in particular when the car is travelling, wherein the consumption-related data of the first car comprises information about:
an expected time of arrival at one of the charging stations, or
an expected charging condition of the car's battery at the arrival at one of the charging stations.

6. The system according to claim 4, wherein each car's consumption-related data comprises usage information related to a planned use of the car in a near future, the usage information at least comprising information about a planned start of a journey involving the car, the near future comprising at least the defined time period.

7. The system according to claim 6, wherein:
each car's consumption-related data comprises information related to the energy consumption of the car, and
the usage information at least comprises information about a planned destination or path of the car journey,
wherein the convergence unit is adapted to estimate the energy consumption needs of the car based on the consumption-related data and on the information about the planned destination or path.

8. The system according to claim 1, wherein a plurality of households are connected to the power grid, wherein each household comprises at least one consumer, and wherein the convergence unit is adapted to generate an optimized energy distribution plan for at least a first household for distributing electric energy among the consumers of the first household.

9. The system according to claim 1, wherein the convergence unit is connected to the power grid, wherein the software agents and the convergence unit are adapted for data transmission via the power grid at least between the convergence unit and each of the software agents.

10. The system according to claim 1, wherein the one or more power generators comprise at least one of solar panels, gasoline, gas or diesel powered generators, and rechargeable battery pack.

11. The system according to claim 1, wherein:
the memory unit comprises a database comprising information of past energy production of each of the power generators, the database being updated continuously, and
the at least one machine learning algorithm is adapted to access the data stored in the database and to schedule a service or a replacement of a power generator based on the information of past energy production of the power generator.

12. The system of claim 1, wherein
the memory unit comprises a database comprising information of past energy consumption of each of the power consumers, the database being updated continuously, and
the at least one machine learning algorithm is adapted to access the data stored in the database and to schedule a service or a replacement of a power consumer based on the information of past energy consumption of the power consumer.

13. The system according to claim 1, wherein:
the memory unit comprises a database comprising information of past energy consumption, and
the at least one machine learning algorithm is adapted to access the data stored in the database and to base an estimation of the energy consumption needs on the information of past energy consumption.

14. A method for managing energy distribution in a power network including a multitude of electric consumers and one or more power generators connected by means of a power grid, the method comprising:
providing a power network management system including a convergence unit having a computing unit, a memory unit, and at least one machine-learning algorithm,
providing a consumer-related software agent to each one of the consumers wherein each consumer-related software agent is adapted to exchange data with the respective consumer and wherein providing the consumer-related software agent comprises:
installing the consumer-related software agent on the consumer, or
connecting a communication module to the consumer, wherein the consumer-related software agent is installed on the communication module,
providing a generator-related software agent to each one of the power generators wherein each generator-related software agent is adapted to exchange data with the respective power generator and wherein providing the generator-related software agent comprises:
installing the generator-related software agent on the power generator, or
connecting a communication module to the power generator, wherein the generator-related software agent is installed on the communication module,
requesting and receiving, from the consumer-related software agents, consumption-related data of the consumers, wherein the consumption-related data comprises at least information about a wattage, user settings, past energy consumption, or a consumption prognosis that are associated with the respective consumer, estimating, based on the consumption-related data and using at least one machine-learning algorithm, energy consumption needs of each of the consumers within a defined time period, requesting and receiving, from the plurality of generator-related software agents, supply-related data of the generators, wherein the supply-related data comprises at least information about a wattage, user settings, past energy production, or a supply prognosis that are associated with the respective generator, estimating, based on the supply-related data and using the at least one machine-learning algorithm, an energy supply potential of each of the generators within the defined time period, generating, by means of an algorithm and based on the estimated consumption needs and the estimated energy supply potential, an optimized energy distribution plan for distributing available electric energy among the consumers, generating consumption plan data for each of the consumers, the consumption plan data comprising instructions for the consumers when to consume electric energy, and providing, via the software agents, the consumption plan data to the consumers.

15. A computer programme product comprising programme code, which is stored on a machine-readable medium and has computer-executable instructions for performing the method of claim 14.

* * * * *